United States Patent
Melick et al.

(10) Patent No.: US 7,181,247 B1
(45) Date of Patent: Feb. 20, 2007

(54) GLOBALLY REFERENCED POSITIONING IN A SHIELDED ENVIRONMENT

(75) Inventors: Bruce D. Melick, Cedar Rapids, IA (US); David M. Snyder, Cedar Rapids, IA (US); Leslie D. Baych, Cedar Rapids, IA (US); Philip T. Kennedy, Cedar Rapids, IA (US)

(73) Assignee: Lightwaves Systems Inc., Cedar Rapids, IA (US)

( * ) Notice: Subject to any disclaimer, the term of this patent is extended or adjusted under 35 U.S.C. 154(b) by 180 days.

(21) Appl. No.: 10/778,878

(22) Filed: Feb. 13, 2004

Related U.S. Application Data

(63) Continuation-in-part of application No. 09/686,181, filed on Oct. 11, 2000, now Pat. No. 6,707,424.

(60) Provisional application No. 60/447,621, filed on Feb. 14, 2003, provisional application No. 60/159,239, filed on Oct. 12, 1999.

(51) Int. Cl.
    *H04M 1/00* (2006.01)
(52) U.S. Cl. .............. 455/562.1; 455/404.2; 455/456.1; 342/357.14; 342/357.06; 342/457
(58) Field of Classification Search .......... 455/13.1, 455/12.1, 456.1; 342/357.14, 357.06; 367/125
See application file for complete search history.

(56) References Cited

U.S. PATENT DOCUMENTS

| | | | |
|---|---|---|---|
| 3,836,951 A | * | 9/1974 | Geren et al. ............ 367/125 |
| 5,982,276 A | | 11/1999 | Stewart |
| 6,054,950 A | * | 4/2000 | Fontana ................ 342/463 |
| 6,185,290 B1 | | 2/2001 | Shaffer et al. |
| 6,195,484 B1 | | 2/2001 | Brennan, III et al. |
| 6,236,652 B1 | | 5/2001 | Preston et al. |
| 6,272,316 B1 | * | 8/2001 | Wiedeman et al. ....... 455/13.1 |
| 6,363,320 B1 | | 3/2002 | Chou |
| 6,430,208 B1 | | 8/2002 | Fullerton et al. |
| 6,532,256 B2 | | 3/2003 | Miller |
| 2001/0036183 A1 | | 11/2001 | Melick et al. |
| 2002/0089423 A1 | | 7/2002 | Przygoda, Jr. |

FOREIGN PATENT DOCUMENTS

| WO | WO 00/041383 | 12/1999 |
|---|---|---|
| WO | WO 00/54488 | 9/2000 |

* cited by examiner

*Primary Examiner*—Temica Beamer
*Assistant Examiner*—Joy Contee
(74) *Attorney, Agent, or Firm*—McKee, Voorhees & Sease, P.L.C.

(57) ABSTRACT

A method, apparatus and system for globally referenced positioning in a shielded environment includes integrating and correlating information from a UWB receiver, a GPS receiver, and a bent-path GPS receiver adapted to extract a GPS radio frequency wave from a heterodyned GPS signal. The method, apparatus, and system is resistant to interference and can be used in a shielded environment such as indoors or behind a line-of-sight barrier.

22 Claims, 5 Drawing Sheets

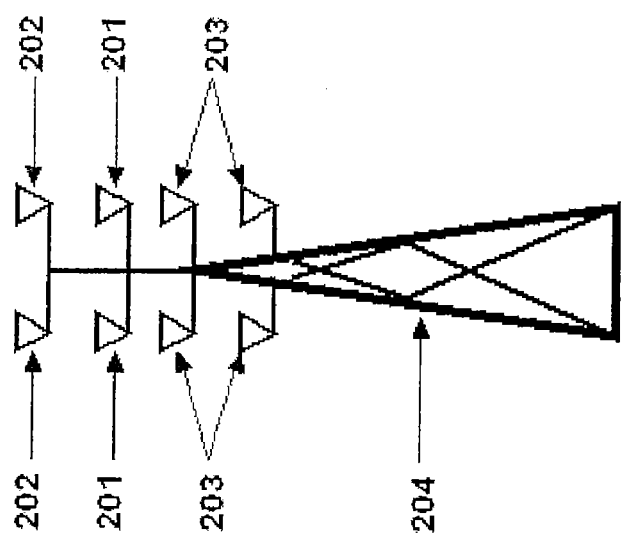

GLOBALLY REFERENCED POSITIONING IN A SHIELDED ENVIRONMENT

CROSS-REFERENCE TO RELATED APPLICATIONS

This application is a conversion of and claims priority to U.S. Ser. No. 60/447,621, filed on Feb. 14, 2003, and herein incorporated by reference in its entirety. This application is also a continuation-in-part of, and claims priority to U.S. Ser. No. 09/686,181, entitled Integrated Positioning System And Method, filed on Oct. 11, 2000 now U.S. Pat. No. 6,707,424, which is a conversion of U.S. Ser. No. 60/159,239, filed on Oct. 12, 1999.

BACKGROUND OF THE INVENTION

1. Field of Invention

This invention relates in general to radio positioning/navigation systems. More specifically and in particular, the present invention, hereinafter described in accordance with the current best mode of practice, is such a radio positioning/navigation system that quickly extends global positioning system (GPS) signals into a shielded environment, or through a line-of-sight barrier via redundant RF carriers to overcome shielding such as ground overburden, jamming, and/or spoofing of the GPS signals by hostile or friendly forces, and combines this with ultra wideband to create a seamless, globally referenced positioning system.

These shielded environments where a globally referenced position is desirable include a structure, areas adjacent to the outer walls of buildings, a bunker deep underground, heavily forested areas, steep and narrow canyons, areas where GPS signals are being jammed or spoofed, etc.

2. Discussion of the Prior Art

A common need and requirement of our society, and for military and intelligence agencies around the world is to accurately track and record positions of personnel, aircraft, vehicles, geographical landmarks, supplies, buildings, and other objects. One method currently used to accomplish this goal uses radio positioning/navigation beacons and associated equipment. Radio positioning/navigation can be broadly defined as the use of radio waves to transmit information, which in turn can be received and utilized to determine position and to navigate. Some radio positioning/navigation systems either currently in use or under development, are Loran, Omega, and Global Navigation Satellite Systems (GPS) such as NAVSTAR, GLONASS (the Russian variant), and proposed European systems such as GALILEO and GRANAS. The radio positioning/navigation system quickly becoming the standard worldwide is the United States' NAVSTAR Global Positioning System (GPS). The NAVSTAR GPS system is capable of providing real-time, three-dimensional position and navigation data.

The NAVSTAR GPS beacon system presently consists of twenty-four orbiting satellites, spaced in six separate circular orbits, with each accommodating four satellites. Of these, twenty-one are normally operational and three serve as spares. Each NAVSTAR GPS satellite reappears above the same ground reference approximately every twenty-three hours and fifty-six minutes. The spacing of satellites is designed to maximize probability that earth users will always have at least four satellites in good geometrical view for navigational use. The basic method of position determination via radio positioning and navigation signals is derived from the concept of triangulation. The term triangulation used herein refers to the general process of determining distance, a.k.a. range, from the present position to multiple known beacons, and mathematically solving for the point in space which satisfies these conditions. As applied to GPS, the procedure requires calculation of signal travel time, which, when multiplied by the speed of light, renders distance.

A basic discussion of positioning/navigation as it relates to the NAVSTAR GPS is contained in a document entitled "GPS NAVSTAR—Global Positioning System, User's Overview" Reference Document YEE-82-009D, March 1991, prepared by ARINC Research Corporation. This document particularly describes the background of the NAVSTAR Global Positioning System, as well as technical descriptions, performance characteristics and actual user segments.

A process known as differential global positioning (DGPS) compensates for many of the errors which are common in radio positioning/navigation systems. An antenna at a known location receives line of sight (LOS) GPS signals and broadcasts a signal with current correction adjustments for each satellite which can be received by any differential receiver within its signal range.

Location accuracy via GPS is continually evolving. Standard GPS receivers can typically produce position estimates within +/−100 meter accuracy. Sub-meter position accuracy of location can be achieved using DGPS. Other techniques for improving accuracy are "Carrier-phase GPS", "Wide Area Augmented GPS" (WAAS), and GPS Interferometry.

GPS relies on no visual, magnetic, or other point of reference which is particularly important in applications such as aviation and naval navigation that traverse polar regions where conventional magnetic navigational means are rendered less effective by local magnetic conditions. Magnetic deviations and anomalies common in standard radio positioning/navigation systems do not hinder GPS. In addition, GPS equipment is typically fabricated of standard, solid state electronic hardware, resulting in low cost, low maintenance systems, having few or no moving parts, and requiring no optics. GPS does not have the calibration, alignment, and maintenance requirements of conventional inertial measuring units, and is available 24 hours per day on a worldwide basis.

One critical limitation of these GPS systems is it requires the beacons to be in direct line-of-sight (LOS) of the receiver. In other words, if the GPS receiver is used in heavily forested areas, in steep and narrow canyons, within a structure, adjacent to the outer walls of buildings, or various other line-of-sight barriers (LSB) or other shielded environments where GPS signals may be jammed or spoofed, the receiver will be unable to obtain a good repeatable reading, or in many cases, any reading at all.

Operating within a line-of-sight barrier (LSB) places fundamental limitations on the performance of radio positioning/navigation systems. The existence of multi-path with different time delays, gives rise to complex, time-varying transmission channels. A direct line-of-site path between beacons and receiver seldom exists within a line-of-sight barrier (LSB), because of interference or reflection from natural or man-made objects, and one must rely on the signal arriving via multi-path. Signals can be received within a line-of-sight barrier (LSB), however to date, the equipment required to mitigate and correct for multi-path remains complex, sophisticated and the process is not repeatable. These multi-path problems, in effect, limit the practical commercial use of radio transmission of positioning/navigation data within a line-of-sight barrier (LSB).

Another dilemma associated with radio transmission of positioning/navigation data within a line-of-sight barrier (LSB) is a phenomenon known as the "near-far" problem. The near-far problem is due to simultaneous broadcasting of signals from multiple broadcast antennae. This problem arises because of the large variation of the user-to-broadcast antennae range. One advantage of using GPS signals is the average power being received from the GPS satellite beacons remains approximately constant due to the large distance of the satellite beacons from the GPS receiver(s). On the other hand in a local system, the broadcast antenna power from broadcast antennae varies a great deal, due to the inverse proportion to the square of the receiver's distance from the broadcast antennae, and can overwhelm other incoming signals.

Although there have been attempts to use radio positioning/navigation signals within a line-of-site barrier, to date the use of this technology is commercially impractical because of the problems described in the previous discussions. In departing radically from traditional RF techniques, ultra wideband (UWB) radio is a recent innovation in radio signal transmissions. Ultra wideband provides an innovative solution for local geo-positioning that overcomes multi-path and near-far problems.

Some line-of-sight barriers may be electronic. Recently, Fox News reported that Iraq may have obtained as many as 400 electronic "jammers" that could throw America's smart bombs off their programmed path if the U.S. goes to war. Jamming is an electronic warfare (EW) technique to limit the effectiveness of an opponents communications and/or detection equipment.

Communications jamming is usually aimed at radio signals to disrupt control of a battle. A transmitter, tuned to the same frequency as the opponents receiving equipment and with the same type of modulation, can with enough power, override any signal at the receiver. The most common types of this form of signal jamming are: Random Noise; Random Pulse; Stepped Tones; Wobbler; Random Keyed Modulated CW; Tone; Rotary; Pulse; Spark; Recorded Sounds; Gulls; and Sweep-through. All of these can be divided into two groups—obvious and subtle.

Obvious jamming is easy to detect, as it can be heard on the receiving equipment, and is usually some type of noise such as stepped tones (bagpipes), random-keyed code, pulses, erratically warbling tones, and recorded sounds. The purpose of this type of jamming is to block out reception of transmitted signals and to cause a nuisance to the receiving operator.

Subtle jamming is that in which no sound is heard on the receiving equipment. The radio does not receive incoming signals, yet everything seems superficially normal to the operator. These are often techical attacks on modern equipment, such as 'SQUELCH capture'.

Radar jamming is the intentional emmission of radio frequency signals to interfere with the operation of a radar by saturating its receiver with false information. There are two types of radar jamming—noise jamming and deception jamming.

A noise jamming system is designed to delay or deny target detection. Noise jamming attempts to mask the presence of targets by substantially adding to the level of thermal noise received by the radar. Noise jamming usually employs high power signals tuned to the same frequency of the radar. The most common techniques include barrage, spot, swept spot, cover pulse, and modulated noise jamming and is usually employed by stand-off jamming (SOJ) assets or escort jamming assets.

Deception jamming systems (also called repeat jammers) are designed to offer false information to a radar to deny specific information on either bearing, range, velocity, or a combination of these. A deception jammer receives the radar signal, modifies it and retransmits the altered signal back to the radar.

AVIACONVERSIA is a Russian company that has made GPS/GLONASS jammers. These jammers have successfully jammed devices with P-code capability and are designed to jam both military and civilian frequencies. Also, these jammers have been designed to work with directional antennas in order to maintain safe areas for friendly forces to access GPS or GLONASS.

In a story in Computerworld, January 2003, entitled "Homemade GPS Jammers Raise Concerns", government officials and communications experts assess the public safety and security implications of a newly posted online article that provides directions for making cheap devices that can jam Global Positioning System (GPS) signals.

Information that has appeared in the online hacker magazine *Phrack*, potentially puts GPS devices used for commercial navigation and military operations at risk, authorities said.

Although the article said the jammer is designed to work only against civil-use GPS signals broadcast on the frequency of 1035.42 MHz and not the military frequency of 1227.6 MHz, James Hasik, an Atlanta-based consultant and author of the book *The Precision Revolution: GPS and the Future of Aerial Warfare*, disagreed.

Hasik said that while the *Phrack* jammer is targeted at civil GPS signals, known as the C/A code, it could also threaten military systems, since "almost all military GPS receivers must first acquire the C/A signal" before locking onto the military signal, known as the P(Y) code.

Hasik said that GPS receivers are especially vulnerable to jamming because of low signal strength after traveling through space from GPS satellites orbiting 12,000 miles above the earth.

The U.S. Department of Defense, which faces the possibility of having its GPS-guided weapons come up against Russian-made GPS jammers in Iraq or elsewhere, has anti-jamming technology at its disposal. Still, Defense officials viewed the *Phrack* article with concern.

Experimental verification of GPS jam immunity has shown its vulnerability under simple intentional interference. The jammer is a CW transmitter of a pure sine-wave of a frequency, close to the carrier of satellite signals. As a result, the carrier and jamming signal beat and make impossible reception of data by the correlator.

GPS uses phase manipulated (PM) signals, which are thought to be highly resistant to interference. The PM signal is a sine-wave and in the predetermined time its phase is reversed step-like. The GPS receiver is based upon the correlator, where the multiplication of the already known waveform and the received signal portion is done, followed by integration over the low-pass band. Integration of the 1024 signal portions results in general reception of the single bit.

Therefore, GPS are highly susceptible to a jamming signal based on a CW sine wave. Thus, both the civilian and military channels can be jammed without knowledge of GPS codes.

The Federal Aviation Administration is developing a nationwide GPS-based precision landing system. The Coast Guard also operates a GPS-based maritime navigation system on both coasts, the Great Lakes, inland waterways and Hawaii. Bill Mosley, a spokesman for the Department of Transportation, the parent agency of the FAA and the Coast Guard, said his department is well aware of the threat posed by GPS jammers.

The DOT's John A. Volpe Transportation Systems Center, in Cambridge, Mass., prepared a report in August 2001 that said, "Some jamming devices/techniques are available on the Internet and proliferation will continue, because a single device that could disrupt military and civil operations worldwide would be attractive to malicious governments and groups."

Although the GPS spread-spectrum signal offers some inherent antijam protection, an adversary who is determined to negate a GPS system need only generate a jamming signal with enough power and suitable temporal/spectral signature to deny the use of GPS throughout a given threat area. This vulnerability has been identified as a high priority within the Department of Defense (DOD), and numerous programs have been established to develop near-term solutions for today's potential threats and more extensive long-term solutions for projected future threats.

The first system developed to increase GPS antijam capability for users on the ground or in the air was the controlled reception pattern antenna. The underlying principle is fairly straightforward: received GPS signals are rather weak and cannot be detected or measured without a signal-correlation process; therefore, the processing algorithm assumes that any measurable energy above the ambient noise must be a jamming signal, and so it computes the necessary weights to null the source.

In addition, a controlled reception pattern antenna can only counter a limited number of jammers, as it eventually runs out of "degrees of freedom" or antijamming options when the number of spatially distributed jammers grows too great.

Various alternatives are being researched as part of the GPS Modernization and Navwar programs. The most obvious approach to increase antijam performance is to increase the transmitted power from the GPS satellites. Although the GPS Modernization program will increase satellite power, this approach alone will not provide the entire antijam performance that is required. It is therefore necessary to provide additional antijam capability from the user equipment. Basically, these user equipment techniques fall into two categories: those that reduce the jammer power while retaining or amplifying the GPS signal and those that increase the signal-to-noise ratio through advanced signal processing in the receiver (i.e., processing gain).

No one method is right for all circumstances because each application presents its own unique requirements and constraints. Moreover, a given technique may be effective against a particular class of threats, but may not necessarily address all threats. For example, an adaptive narrowband filter is effective against a jammer that has some repetitive or predictable signal structure, but is ineffective against a broadband noise jammer, whose signal cannot be predicted from previous samples. Likewise, spatial adaptive antenna arrays are effective against a limited number of broadband noise and structured signal jammers, but eventually run out of degrees of freedom as the number of jammers increases.

What is needed is a radio positioning/navigation system that overcomes the problems described above and provides repeatable, precise sub-centimeter positioning/navigation data for locating objects in direct line of sight (LOS) of GPS beacons, within line-of-sight of "bent path" GPS beacons, and within line-of-sight barriers (LSB) or other shielded environments. This system would be capable of overcoming shielding such as ground overburden, jamming, and/or spoofing of the GPS signals by hostile or friendly forces, and combines this with ultra wideband to create a seamless, globally referenced positioning system for a wide variety of applications.

SUMMARY OF INVENTION

The present invention relates to a globally referenced positioning system for use within a shielded environment, or line-of-sight barrier.

According to one aspect of the present invention, a device for position determining is disclosed. The device is resistant to interference such as jamming and is capable of use within a shielded environment. The device includes a UWB receiver, a GPS receiver, and a bent-path GPS receiver. There is an intelligent control operatively connected to the UWB receiver, the GPS receiver, and the bent-path GPS receiver. The intelligent control is adapted to determine globally referenced positions at least partially based on integrating and correlating UWB data, data from the GPS receiver, and data from the bent-path GPS receiver.

According to another aspect of the present invention, a method of determining position is disclosed. The method includes receiving a GPS signal from a GPS receiver. The method also includes receiving a signal from a UWB receiver. The method further includes receiving a signal from a bent-path GPS receiver. Data from these three and/or additional sources (such as DGPS or WAAS) is integrated and correlated in order to determine a globally referenced position.

The present invention overcomes the problem of being able to quickly provide global references for a local positioning system, such as ultra wideband, within a shielded environment, or "bent path" GPS systems.

The present invention uses a receiving antenna, or antennae positioned exterior to a structure, or other line-of-site barrier. The antennae may also be positioned in a zone where GPS signals received directly from satellites are suspect due to jamming or spoofing. The exterior receiving antenna(e) is positioned at a known location(s) to receive unaltered signals from GPS orbiting satellites. Optionally, correction signals from Differential GPS (DGPS), or the Wide Area Augmentation System (WAAS) may also be used to enhance the precision of GPS signals.

In the case of using GPS within a structure, or indoors, direct-line-of-sight GPS signals are received by an exterior antenna and re-transmitted into the structure. The signals are then sent to a constellation of broadcast antennae operating within the structure. Each broadcast antennae in the indoor constellation broadcasts signals either sequentially, or on a different frequency simultaneously. The re-transmitted signals have a "bent path" and are not suitable for determining a location inside the structure without post-processing.

When in a theatre of operations in which direct line-of-sight GPS signals are suspect due to jamming or spoofing, unaltered GPS signals are received by a constellation of exterior antennae operating outside the potentially corrupt area. Each exterior antenna operates at a known location and re-transmits GPS signals onto one or more different carrier frequencies, including, but not limited to AM and FM radio stations, TV broadcasts, maritime mobile channels, aeronautical mobile channels, satellite broadcasts other than GPS, and radiolocation and navigation signals other than GPS, etc. The re-transmitted GPS signals on other carrier frequencies may be continuously broadcast, or alternatively they may be broadcast in a frequency and/or time hopping manner. As an example, the re-transmitted GPS signals may first be broadcast on AM radio station 600 for a pre-determined period of time, second on AM radio station 800 for a pre-determined period of time, third on FM radio station 96.7 for a pre-determined period of time, fourth on TV channel 9 for a pre-determined period of time, then re-starting the frequency hopping sequence back on AM radio station 600 for a pre-determined period of time. The pre-determined period of time that the re-transmitted GPS signals are broadcast on a specific carrier frequency may, or may not, vary according to a pre-determined pseudo-random pattern.

This creates one, or more, redundant "bent signal paths" into the theatre of operations. A "bent path" signal is a non-linear signal path described in U.S. Pat. No. 6,201,497 to Snyder, et al, and granted to the inventors of the present invention, in which GPS satellite radiolocation and navigation signals are received in line-of-sight of GPS satellites by a GPS antenna and re-radiated which creates a non-linear signal path from a GPS satellite to a GPS receiver. The re-transmitted "bent path" signals received by a GPS receiver are not suitable for use in determining a location without post-processing. Therefore, a GPS receiver may be re-configured to use a separate radio to receive heterodyned GPS "bent path" signals, and de-heterodyne them to standard GPS frequencies for normal use by a GPS receiver. For clarification, according to one aspect of the present invention, a GPS radio frequency wave is combined with a locally generated wave of a different frequency so as to produce a new frequency equal to the sum or the difference between the two. De-heterodyne is the process by which a locally generated wave used to heterodyne the original GPS radio frequency is added or subtracted to restore the original GPS radio frequency signal(s).

The precision of this system can be enhanced using a single satellite signal for re-radiation in order to remove biases introduced by different ionospheric and tropospheric conditions, receiver noise, PRN code noise, satellite vehicle clock errors, ephemeris errors, etc., associated with using multiple satellites to determine a location. The following chart illustrates the typical error associated using multiple versus a single GPS satellite.

multi-path resistance. However, UWB positioning systems are relative or localized systems, and not correlated to GPS coordinates. This places extreme limitations on the usefulness of UWB positioning data in applications where global coordinates are required. The present invention integrates GPS for outdoor locations with UWB for indoor locations, to create a precise, seamless positioning/navigation system. In addition, this system provides for the correlation of these two technologies so that every position, indoor or outdoor, is globally referenced.

As an example, the present invention can use a GPS/UWB reference array, mounted on a tripod in line-of-sight of GPS satellites and located near the entrance of a shielded environment such as a bunker, an urban area, or within a structure. The reference array may optionally use correction signals from Differential GPS (DGPS), or the Wide Area Augmentation System (WAAS) (both of which are well known in the art) to enhance the precision of the incoming GPS signals. Also, reference arrays may be daisy-chained by direct line-of-sight to quickly transfer globally referenced positions into a shielded environment, via our "bent path" process.

In addition to a daisy-chained topography, a hub-and-spoke topography may be used to connect reference arrays which may not be in direct line-of-sight of other reference arrays, but a more centrally located reference array at a hub location, such as, but not limited to, an airborne platform, the top of a building, a tower, etc.

Once inside a shielded environment a localized ultra wideband positioning system can be employed to locate and track objects. In the case of using a reference array in a theatre of operations in which direct line-of-sight GPS signals are suspect due to jamming or spoofing, "bent path" GPS signals that have been "heterodyned" onto other carrier frequencies may be received from a constellation of antennae operating outside the potentially corrupt theatre. The precision of this system can be enhanced using a single satellite signal for re-radiation in order to remove biases introduced by different ionospheric conditions, magnetic fields, etc., associated with using multiple satellites to determine a location.

| GPS LOCATION USING MULTIPLE SATELLITES AS A TIMING SOURCE | | | LOCATION USING SINGLE GPS SATELLITE AS A TIMING SOURCE | | |
|---|---|---|---|---|---|
| Source | Error/SV | Error | Source | Error/SV | Error |
| Receiver | Clock/Sample | <1 meter | Receiver | Clock/Sample | <1 meter |
| Receiver | Noise | 1 meter | Receiver | Noise | 1 meter |
| PRN Code | Noise | 1 meter | PRN Code | Noise | Relative To Same SV |
| SV | Clock | 1 meter | SV | Clock | Relative To Same SV |
| Ephemeris | Data | 1 meter | Ephemeris | Data | Relative To Same SV |
| Troposphere | Delay | 1 meter | Troposphere | Delay | Relative To Same SV |
| Ionosphere | Delay | 10 meters | Ionosphere | Delay | Relative To Same SV |
| Multipath | Delay | 0.5 meter | Multipath | Delay | 0.5 meter/Cell Tower |
| | | | Re-radiation | Noise | 1 meter |
| TOTAL | | 16.5 meters | TOTAL | | 3.5 meter |

UWB positioning systems can provide sub-centimeter location accuracy due to the rate of their timing signal and Therefore, it is a primary object, feature, or advantage of the present invention to improve over the state of the art.

It is a further object, feature, or advantage of the present invention to provide a radio positioning/navigation system that is useful in a shielded environment.

Another object, feature, or advantage of the present invention to provide a radio positioning/navigation system that is resistant to various known jamming techniques.

A still further object, feature, or advantage of the present invention is to provide a radio positioning/navigation system that can be used despite a line-of-sight barrier blocking the view of one or more satellites.

It is another object, feature, or advantage of the present invention to integrate "bent path" GPS with ultra wideband technology into a seamless system for determining the positions of objects and personnel.

Yet another object, feature, or advantage of the present invention to provide globally referenced positions.

A further object, feature, or advantage of the present invention to utilize "bent path" GPS to quickly transfer GPS information into a shielded environment.

A still further object, feature, or advantage of the present invention to utilize GPS beacon signals, which have been acquired in direct line-of-sight outside a shielded environment.

Another object, feature, or advantage of the present invention to enhance the location accuracy of objects and personnel using differential signals.

Yet another object, feature, or advantage of the present invention to pass GPS beacon signals through a shielded environment or other line-of-sight barrier.

It is a further object, feature, or advantage of the present invention to re-radiate the GPS beacon signals within a shielded environment or line-of-sight barrier.

It is still a further object, feature, or advantage of the present invention to transmit data to an optional host computer to provide enhanced information services.

Another object, feature, or advantage of the present invention for multiple receiver/processors to communicate with each other.

Yet another object, feature, or advantage of the present invention to provide standard globally referenced positions using one or more radio positioning signals received line-of-sight, and/or "bent-path", which may have been heterodyned onto one or more carrier frequencies to defeat intentional or unintentional signal jamming and/or spoofing by unfriendly forces.

Yet another object, feature, or advantage of the present invention is the use of Assisted GPS technology.

It is still a further object, feature, or advantage of the present invention to use the present invention in conjunction with intentional jamming or spoofing controlled by friendly forces.

These and/or other objects, features, or advantages of the present invention will be better understood from review of the detailed description which follows.

BRIEF DESCRIPTION OF THE DRAWINGS

FIG. 2A is an illustration of a GPS/UWB reference array.

DETAILED DESCRIPTION OF A PREFERRED EMBODIMENT

Figure 1:
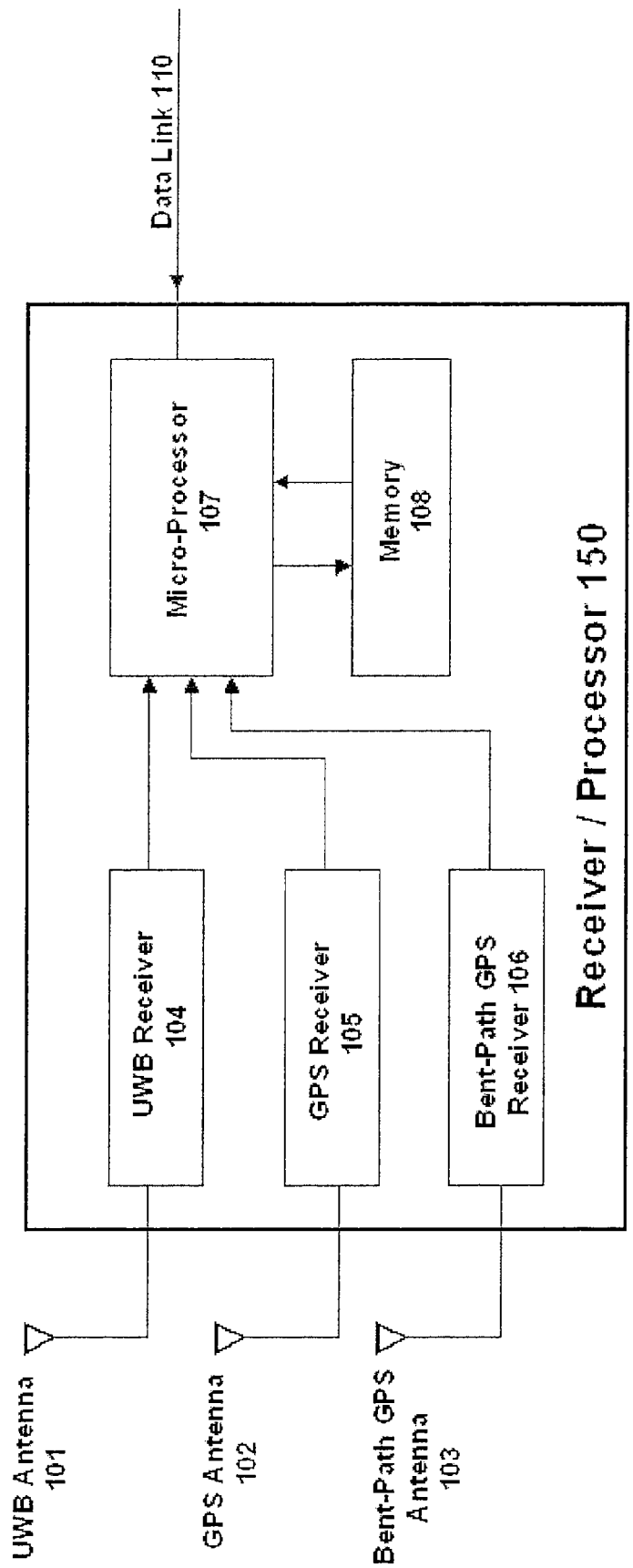
FIG. 1 is an illustration of a receiver/processor.

The present invention is now described with reference to the figures wherein like reference numbers denote like elements. In describing the present invention, those skilled in the art and familiar with the instant disclosure of the present invention will recognize additions, deletions, modifications, substitutions, and other changes which will fall within the purview of the subject inventions and claims. Although one or more preferred embodiments are discussed herein, the present invention is not, in any way, to be limited to these preferred embodiments. Rather, the invention should only be limited by the full scope of the claims.

The present invention is a system in which receiver/processors 150 which may be mobile, or located in fixed positions, are capable of determining their globally referenced position in real-time, with sub-meter accuracy when operating in direct line-of-sight of GPS beacons 303 within direct line-of-sight of GPS/UWB reference arrays 200" or within a shielded environment using a local ultra wideband system GPS/UWB reference arrays 200, 200'. These shielded environments may be an urban setting, within a building, within an underground bunker, or within a theatre of operations in which GPS signals are being jammed or spoofed, etc. The GPS/UWB reference arrays 200, 200', 200" are located at elevations that are geometrically efficient for the purpose of being used for location purposes. In the present invention, positioning/navigation is accomplished using a receiver/processor 150 which integrates GPS and ultra wideband hardware, and correlates the data using a micro-processor 107.

FIG. 1 illustrates the general configuration of a receiver/processor 150 used in the present invention. The ultra wideband receiver 104 is multi-channel, and capable of simultaneously receiving pseudo-random coded ultra wideband signals from other receiver/processors 150, and/or multiple GPS/UWB reference arrays 200, 200', 200" via UWB receiver 101.

The GPS receiver 105 receives GPS signals 303 via GPS receiver antenna 102. The "bent path" GPS receiver 106 receives "bent path" GPS signals 305, 305', 305" via "bent path" GPS receiver antenna 103.

The micro-processor 107 is capable of processing information from UWB receiver 104, and/or GPS receiver 105, and/or "bent path" GPS receiver 106 in order to determine global positioning/navigation data. In addition, micro-processor 107 is capable of jamming detection as described in U.S. Pat. No. 6,448,925, entitled Jamming Detection and Blanking for GPS Receivers, to Kudhrethay A. Shridhara, and is hereby incorporated by reference.

Optionally, accuracy can be increased by using information obtained from systems such as Differential GPS (DPGS), or the Wide Area Augmentation System (WAAS).

The micro-processor 107 integrates and correlates ultra wideband and GPS positioning/navigation data in order to determine globally referenced positions, and transmits position information to other receiver/processors 150, and/or an optional host computer (not shown), via data link 110. The data link 110 may be either hardwired, or wireless. A hardwired link may be USB, RS-232, etc. The wireless link may be a conventional radio, or an ultra wideband radio. The optional host computer may be located in places, such as but not limited to, an AWACS airplane or other airborne platform, a remote ground-based command center, etc.

FIG. 2A is an illustration of a GPS/UWB reference array 200, which is comprised of a support structure 204, UWB transmit and receive antennae 203, and GPS receive antenna 201, and a GPS "bent path" receive and transmit antenna 202.

The GPS/UWB reference array support structure 204 can be scaled to be a tower, or a small tripod. UWB transmit and receive antennae 203 transmit wirelessly distinct, complex, coded pulses of radio frequency energy, and are timed to within a few pico-seconds in time. The distinct, complex, coded pulses are used to identify particular UWB transmit and receive antennae 203, and are also used to allow multiple UWB transmit and receive antennae 203 to operate on the same center channel frequency simultaneously. The pulses are timed according to a complex code that is shared by the sender and the receiver, and can be used in a manner similar to GPS for local positioning and navigation.

The UWB transmit and receive antennae 203 are arranged in a geometrical pattern that is efficient for accurate triangulation with either a two- or three-dimensional positioning/navigation system, as applicable. Specifically, it should be noted that in a two-dimensional system the operating centers of the beacons are not all located co-linear, and in a three-dimensional system the operating centers of the beacons are not all located co-linear or co-planar.

The UWB transmit and receive antennae 203 may also use a frequency hopping scheme as described in U.S. Pat. No. 6,430,211, entitled Frequency Hopping for Baseband Transmitter, to Roberto G. Aiello, and is hereby incorporated by reference. This provides UWB signals additional anti-jamming capabilities.

Figure 4:
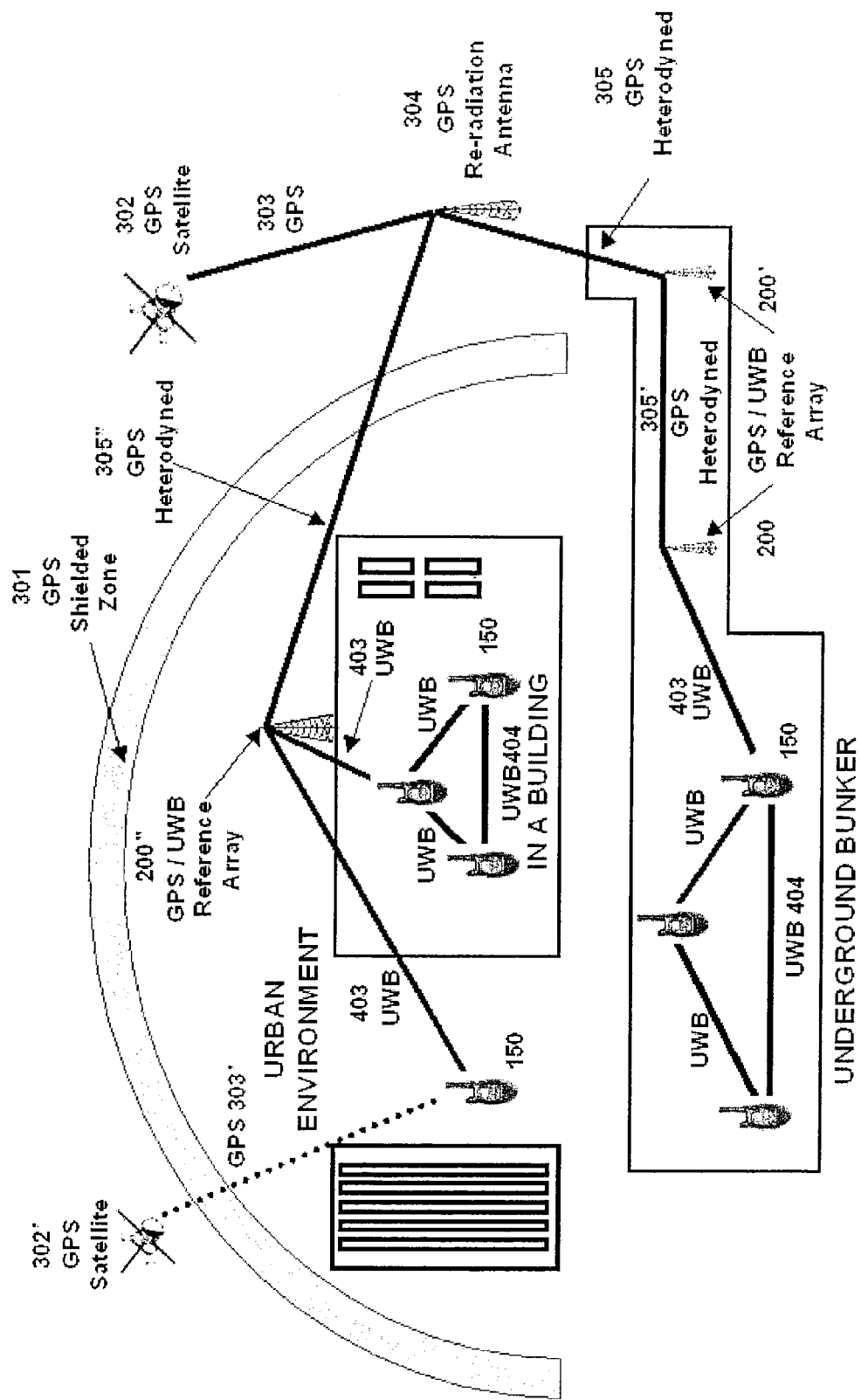
FIG. 4 is an illustration of the preferred embodiment of the present invention which combines "bent path" GPS and UWB signals being used for globally referenced position in various shielded zones.

When a GPS/UWB reference array 200, 200', 200" is operating within direct line-of-sight of GPS satellites 302, 302', 302" as shown in FIG. 4, it may determine its position using unaltered GPS signals 303, 303', 303". A minimum of two GPS receive antennae 201 are required to determine the bearing, or azimuth of the GPS/UWB reference array 200, 200', 200". Bearing information is required in order to fix the position of the UWB transmit and receive antennae 203 with respect to the GPS/UWB reference array support structure 204.

When a GPS/UWB reference array 200, 200', 200" is operating within a GPS shielded zone 301, its position may be determined using "bent path" GPS heterodyned signals 305, 305', 305" from GPS re-radiation antennae 304, 304', 304" as shown in FIG. 4. A minimum of two "bent path" GPS antennae 202 are required to determine the bearing, or azimuth of the GPS/UWB reference array 200, 200', 200". Bearing information is required in order to fix the position of the UWB transmit and receive antennae 203 with respect to the GPS/UWB reference array support structure 204.

The accuracy of the bearing, or azimuth between the two GPS receive antennae 201, or "bent path" GPS antennae 202 is critical to determining the operational range of the GPS/UWB reference array 200, 200', 200".

For example if the spread between the two GPS receive antenna 201, or "bent path" GPS antennae 202 is sixty inches, and the self-determined location accuracy of these antennae is a 1 inch radius, the bearing, or azimuth between these antennae will be a maximum of 1.6 degrees. At an operational distance of 2000 feet from a GPS/UWB reference array this would translate to an operational accuracy of +/−6 meters. At an operational distance of 1000 feet from a GPS/UWB reference array this would translate to an operational accuracy of +/−3 meters, and at a distance of 500 feet the operational accuracy would approach +/−1.5 meters.

The accuracy of the bearing of the GPS/UWB reference array 200, 200', 200" can be enhanced using three or more co-linear antennae.

The following chart is an example of an UWB data frame that can be used to transmit GPS timing signals, GPS navigation data, GPS/UWB reference array data, GPS re-radiation antennae data, and may contain other areas for voice or data communication.

| | |
|---|---|
| 2 octets | FRAME HEADER |
| 128 octets | GPS PR CODE |
| 8 octets | GPS NAVIGATION DATA |
| 1,536 octets | GPS RE-RADIATION ANTENNAE DATA |
| 1,536 octets | GPS/UWB REFERENCE ARRAY DATA |
| 3,748,458 octets | VOICE COMMUNICATIONS |
| 3,748,458 octets | DATA COMMUNICATIONS |
| 2 octets | FRAME CHECK |

Figure 2B:
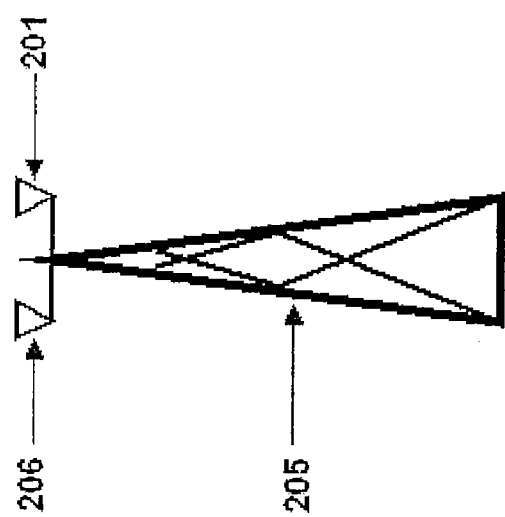
FIG. 2B is an illustration of a GPS re-radiation antenna.

FIG. 2B is an illustration of an GPS re-radiation antenna 304, which is comprised of a support structure 205, re-radiation antenna 206, and GPS receive antenna 201.

The GPS receive antenna 201 is used to fix the position of the GPS re-radiation antenna 304. The re-radiation antenna 206 is used to re-broadcast GPS signals onto other wireless radio frequency carriers, or sequentially in conjunction with other GPS re-radiation antennae 304.

Figure 3:
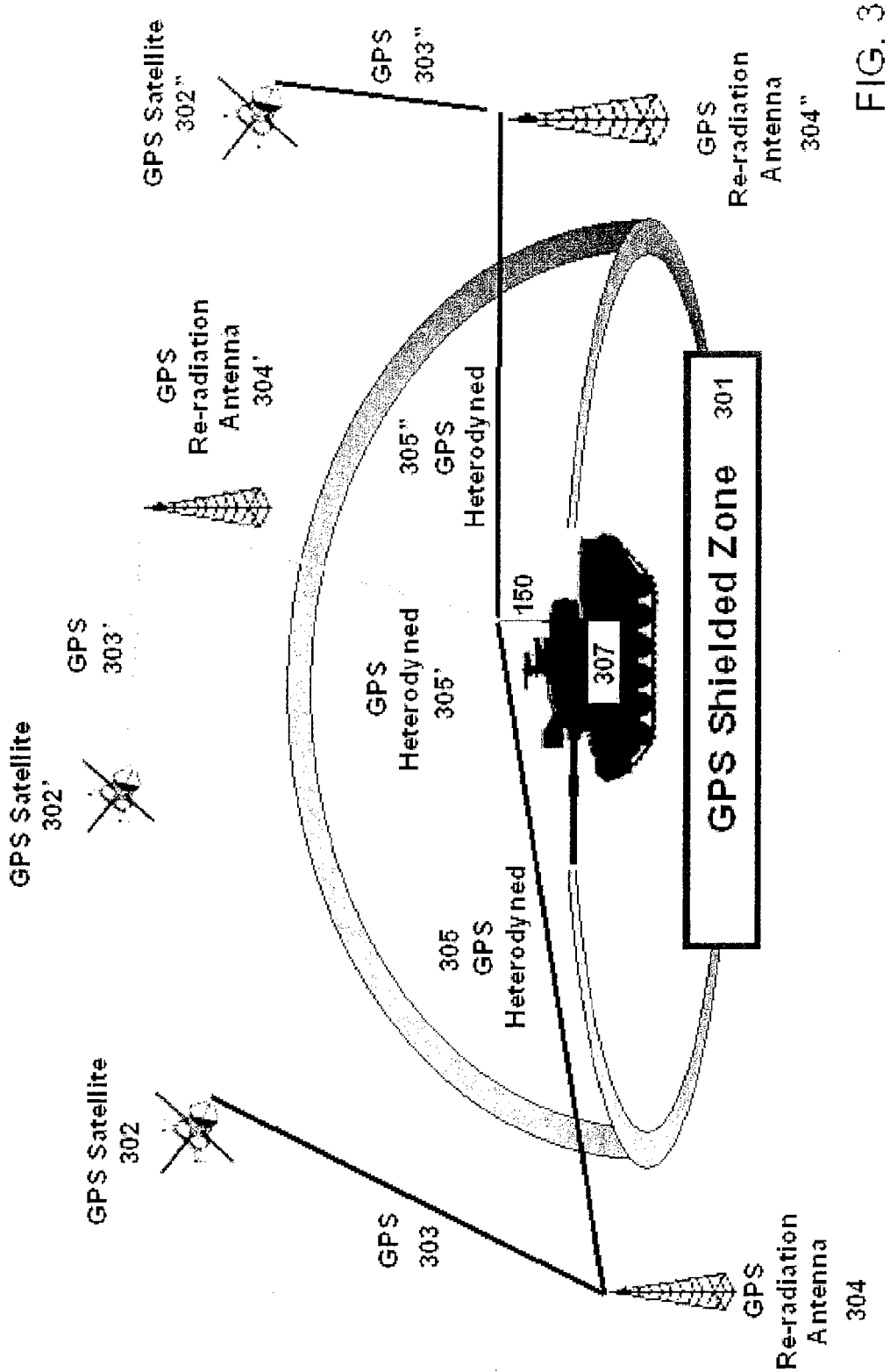
FIG. 3 is an illustration of "bent path" GPS.

FIG. 3 is an illustration of "bent path" GPS that has been described in U.S. Pat. No. 6,301,497. GPS shielded zone 301 is shown as an area in which direct line-of-sight GPS signals 303 are being jammed or spoofed. GPS re-radiation antennae 304, 304', 304" are located outside GPS shielded zone 301 and receive GPS signals 303, 303', 303" direct line-of-sight from GPS satellites 302, 302', 302" respectively. The GPS re-radiation antennae 304, 304', 304" operate at known locations which may be fixed or mobile, and re-broadcast GPS heterodyned signals 305, 305', 305" in order to create redundant signal sources which can be used for positioning/navigation purposes within a GPS shielded zone 301. These GPS heterodyned signals 305, 305', 305" may be broadcast on one or more conventional wireless radio frequency carriers, or ultra wideband. Tank 307 equipped with receiver/processor 150, operating in GPS shielded zone 301 may be prohibited from receiving GPS signals 303, 303', 303" via a direct line-of-sight due to jamming and/or spoofing, is still capable of determining its position by triangulation using the un-jammed or un-spoofed "bent path" GPS heterodyned signals 305, 305', 305" being broadcast from a minimum of three GPS re-radiation antennae 304, 304', 304" operating a known locations. A minimum of three sources are required in order to fix a longitude and latitude, or a minimum of four sources to fix longitude, latitude, and altitude.

Tank 307 is illustrated in FIG. 3, but may be any object or person equipped with a receiver/processor 150.

For purposes of clarity FIG. 3 illustrates GPS re-radiation antennae 304, 304', 304" receiving signals from only a single GPS satellite 302, 302', 302" but it is well known that a minimum of three GPS satellites are required in order to fix latitude and longitude, and a minimum of four GPS satellites are required in order to fix latitude, longitude, and altitude.

In addition, FIG. 3 illustrate GPS re-radiation antennae 304, 304', 304" each using a different GPS signal 303, 303', 303", but the GPS re-radiation antennae may all be using the same GPS signal 303, 303', 303". When a single satellite signal is re-broadcast from different GPS re-radiation antennae 304, 304', 304" the normal biases such as magnetic anomalies and atmospheric conditions can be greatly reduced.

The following off-the-shelf equipment was used in the development and testing of a "bent path" GPS system: survey-grade GPS receivers, DGPS antenna, cabling, and custom software for post-processing the "bent path" signals. The tests were conducted indoors in a variety of buildings that shielded the receivers from a direct line-of-sight of GPS satellites.

FIG. 4 is an illustration of the preferred embodiment of the present invention which combines "bent path" GPS heterodyned signals 305, 305', 305" and local UWB signals 403 to quickly extend globally referenced positions into various shielded zones, or line-of-sight barriers.

Examples of GPS shielded zones include GPS shielded zone 301 which is present due to jamming or spoofing of GPS satellite signals 303' an outdoor urban environment that includes tall buildings, within a building, or within an underground bunker, etc. Other examples of a GPS shielded zone may include heavy tree canopy, steep and narrow canyon walls, etc.

The basic necessary elements of the present invention are GPS satellites 302, 302' receiver/processors 150, GPS re-radiation antenna 304, and GPS/UWB reference arrays 200, 200', 200"

The GPS signals 303' being broadcast from GPS satellite 302' cannot be received by receiver/processor 150 operating in the urban environment due to the jamming of GPS shielded zone 301. To overcome jamming and/or spoofing the present invention uses GPS re-radiation antennae 304 positioned outside a GPS shielded zone 301 in order to receive unaltered GPS satellite signals 303. The GPS re-radiation antenna 304 are shown as fixed reference positions, but may be mobile reference platforms located on an airplane, vehicles, etc. The GPS re-radiation antennae 304 transmit the GPS signals 303 onto new wireless radio frequency carriers. This creates redundant paths into a GPS shielded zone 301. The GPS re-radiation antennae 304 are capable of transmitting GPS signals 303 onto multiple wireless radio frequency carriers (GPS heterodyned signals 305, 305', 305") simultaneously, or in a center channel frequency hopping mode in order to reduce the possibility of having the GPS heterodyned signals 305, 305', 305" jammed, or spoofed.

The "bent path" GPS heterodyned signals 305, 305', 305" may be received directly by a receiver/processor 150 or by a GPS/UWB reference array 200, 200', 200" operating in a GPS shielded zone 301.

Only one GPS re-radiation antenna 304 is shown for clarity, but a minimum of three sources are required in order to fix a longitude and latitude, or a minimum of four sources to fix longitude, latitude, and altitude.

The algorithm for using "bent path" GPS heterodyned signals 305, 305', 305" is disclosed in the previously referenced U.S. Pat. No. 6,301,497, to Melick, et al.

The precision of this globally referenced positioning/navigation system can be enhanced when GPS re-radiation antennae 304 are all using a single satellite signal 303 in order to remove biases introduced by different ionospheric conditions, magnetic fields, etc., associated with using multiple satellites to determine location and navigation data.

Precision can be further enhanced using correction signals from Differential GPS (DGPS) (not shown), or the Wide Area Augmentation System (WAAS) (not shown) which are both well known in the art.

Ultra wideband is the premier technology for use as a local positioning system due to its exceptional multi-path resistance and resolution. The critical limitation of all ultra wideband systems, except the one described in U.S. patent application Ser. No. 09/686,181, to Melick, et al, is they are not globally referenced, nor are they integrated with GPS, or "bent path" GPS systems.

The GPS/UWB reference array 200, 200', 200" described in FIG. 4 provide a mesh of globally referenced points. Receiver/processors 150 are capable of determining their position using GPS satellite signals 303 received direct line-of-sight (not shown) from a constellation of GPS satellites 302 (only two shown for clarity). In addition, when operating within a shielded zone 301 where GPS jamming and/or spoofing may be present, the GPS/UWB reference array 200, 200', 200" can also determine their position through the use of GPS heterodyned signals 305, 305', 305" being transmitted from a constellation of GPS re-radiation antennae 304 (only one shown for clarity).

The GPS/UWB reference arrays 200, 200' can be daisy-chained as shown in the underground bunker environment to quickly and efficiently transmit "bent path" GPS heterodyned signals 305, 305' in order to maintain a global reference for receiver/processors 150 operating deep underground. Although, the GPS heterodyned signal 305 path from GPS re-radiation antenna 304 to GPS/UWB reference arrays 200, 200' is shown as a wireless channel, this channel could also be wired.

The GPS/UWB reference arrays 200, 200', 200" shown in FIG. 4 are located at fixed locations, but may be mobile reference platforms located on an airplane, vehicles, or personnel.

The UWB transmission paths 403 are direct line-of-sight from the known location of GPS/UWB reference arrays 200, 200', 200" to any receiver/processor 150 which is operating within the broadcast range of the GPS/UWB reference array 200, 200', 200".

Many local ultra wideband systems 404 have been described for location and navigation purposes, and include U.S. Pat. No. 6,300,903, entitled System and Method for Person or Object Position Location Utilizing Impulse Radio, to Richards, et al., U.S. Pat. No. 6,054,950, entitled Ultra Wideband Precision Geolocation System, to Robert J. Fontana, and U.S. Pat. No. 6,133,876, entitled System and Method for Position Determination by Impulse Radio, to Fullerton, et al, which are hereby incorporated by reference.

The present invention may be augmented with a technology known as Assisted GPS, or A-GPS. A-GPS technology can be implemented over the present invention's bent path and/or UWB channels. The following patents describe this technology, and are herein incorporated by reference: U.S. Pat. No. 5,999,124 entitled Satellite Positioning System Augmentation With Wireless Communication Signals and U.S. Pat. No. 6,131,067 entitled Client-Server Based Remote Locator Device.

An ultra wideband system that has been integrated and correlated with GPS is described in U.S. patent application Ser. No. 09/686,181, entitled Integrated Positioning System And Method, to Melick, et al, which was previously incorporated by reference.

While the present invention describes a radio positioning/navigation system that quickly extends global positioning system (GPS) signals into a shielded environment, or through a line-of-sight barrier via redundant RF carriers to overcome shielding such as ground overburden, jamming, and/or spoofing of the GPS signals, and combines this with ultra wideband to create a seamless, globally referenced positioning system. Though military applications were described, it is contemplated that variations and modifications for commercial use will be developed within the teaching of the present disclosure.

What is claimed is:

1. A position determining apparatus that is resistant to interference and capable of use within a shielded environment, comprising:
    a UWB receiver;
    a GPS receiver;
    a bent-path GPS receiver;
    an intelligent control operatively connected to the UWB receiver, the GPS receiver, and the bent-path GPS receiver;
    the bent-path GPS receiver adapted to receive a heterodyned GPS signal comprising a GPS radio frequency wave and a wave of a different frequency, and to deheterodyne the heterodyned GPS signal to extract the GPS radio frequency wave;
    the intelligent control adapted to determine globally referenced positions at least partially based on integrating and correlating ultra wideband data received from: the UWB receiver, GPS data received from the GPS receiver, and/or GPS data received from the bent-path GPS receiver.

2. The apparatus of claim 1 further comprising a data interface operatively connected to the intelligent control for providing a data link.

3. The apparatus of claim 1 wherein the data link is wireless.

4. The apparatus of claim 1 wherein the intelligent control determines globally referenced positions at least partially based on data received from a differential GPS.

5. The apparatus of claim 1 wherein the intelligent control determines globally referenced positions at least partially based on data received from a Wide Area Augmentation System.

6. The apparatus of claim 1 wherein the interference is jamming.

7. A method of determining position that is resistant to interference and capable of use within a shielded environment, comprising:
    receiving a GPS signal from a GPS receiver;
    receiving a signal from a UWB receiver, the signal comprising a plurality of pulses timed according to a complex code shared by the UWB receiver and a UWB transmitter, encoding identification information of the UWB transmitter for use in triangulation of location;
    receiving a signal from a bent-path GPS receiver, the signal being a GPS radio frequency wave extracted from a heterodyned GPS signal;
    integrating and correlating GPS data received from the GPS receiver and/or GPS data received from the bent-path GPS receiver with UWB data received from the UWB receiver to determine a globally referenced position.

8. The method of claim 7 wherein the globally referenced position is a position within the shielded environment.

9. The method of claim 7 further comprising transmitting the globally referenced position.

10. The method of claim 9 wherein the step of transmitting is wireless transmitting.

11. The method of claim 7 wherein the step of transmitting is transmitting with a UWB transmitter.

12. The method of claim 7 wherein the step of transmitting is transmitting from a GPS re-radiation antenna to a GPS/UWB reference array is wired transmitting.

13. The apparatus of claim 1 further comprising a housing and wherein the UWB receiver, bent path GPS receiver, and GPS receiver are disposed within the housing.

14. The apparatus of claim 1 wherein the interference is spoofing.

15. A position determining apparatus that is resistant to interference and capable of use within a shielded environment, comprising:
    a UWB receiver;
    a GPS receiver adapted for receiving GPS signals and time division multiplexed GPS signals;
    an intelligent control operatively connected to the UWB receiver, and the GPS receiver;
    the intelligent control adapted to determine globally referenced positions at least partially based on integrating and correlating ultra wideband data received from the UWB receiver with GPS data received from the GPS receiver and/or time division multiplexed GPS signal data received from the GPS receiver.

16. The apparatus of claim 15 further comprising a data interface operatively connected to the intelligent control for providing a data link.

17. The apparatus of claim 16 wherein the data link is wireless.

18. The apparatus of claim 15 wherein the intelligent control determines globally referenced positions at least partially based on data received from a differential GPS.

19. The apparatus of claim 15 wherein the intelligent control determines globally referenced positions at least partially based on data received from a Wide Area Augmentation System.

20. The apparatus of claim 15 wherein the interference is jamming.

21. The apparatus of claim 15 wherein the interference is spoofing.

22. The apparatus of claim 15 further comprising a housing wherein the UWB receiver and the GPS receiver are disposed within the housing.

* * * * *